(12) United States Patent
Miranda et al.

(10) Patent No.: US 9,221,722 B2
(45) Date of Patent: Dec. 29, 2015

(54) AGRICULTURAL BLEND AND PROCESS OF FORMING AN AGRICULTURAL BLEND

(71) Applicant: HARSCO CORPORATION, Camp Hill, PA (US)

(72) Inventors: Stephen R. Miranda, Coraopolis, PA (US); Douglas W. Hutchinson, Clarksville, PA (US)

(73) Assignee: Harsco Corporation, Camp Hill, PA (US)

( * ) Notice: Subject to any disclaimer, the term of this patent is extended or adjusted under 35 U.S.C. 154(b) by 0 days.

(21) Appl. No.: 14/252,010

(22) Filed: Apr. 14, 2014

(65) Prior Publication Data

US 2014/0331728 A1    Nov. 13, 2014

Related U.S. Application Data

(63) Continuation of application No. 12/879,432, filed on Sep. 10, 2010, now Pat. No. 8,734,560.

(51) Int. Cl.

| | | |
|---|---|---|
| *C05D 9/00* | (2006.01) | |
| *C05G 1/00* | (2006.01) | |
| *C05D 3/04* | (2006.01) | |
| *C05B 5/00* | (2006.01) | |

(Continued)

(52) U.S. Cl.
CPC ... *C05D 3/04* (2013.01); *B01J 2/00* (2013.01); *B09C 1/08* (2013.01); *C05B 5/00* (2013.01); *C05C 3/00* (2013.01); *C05D 3/00* (2013.01); *C05D 3/02* (2013.01); *C05D 5/00* (2013.01); *C05D 9/00* (2013.01); *C05D 9/02* (2013.01); *C05G 1/00* (2013.01); *C05G 3/08* (2013.01)

(58) Field of Classification Search
CPC .............. C05B 5/00; C08L 91/00; C08L 5/00; C08L 89/00; C05D 3/00; C05D 3/04; C05D 3/02; C08K 5/098; C09J 189/00; C09J 103/02; C05G 3/0082; B05B 5/00; B09B 3/0082; B09B 3/0025
See application file for complete search history.

(56) References Cited

U.S. PATENT DOCUMENTS

| | | | |
|---|---|---|---|
| 2,903,349 | A | 9/1959 | Bryant |
| 3,137,565 | A | 6/1964 | Hayes |

(Continued)

FOREIGN PATENT DOCUMENTS

| | | |
|---|---|---|
| CN | 86107166 A | 5/1988 |
| CN | 1030567 A | 1/1989 |

(Continued)

OTHER PUBLICATIONS

Pereira, et al. Extractors of Available Silicon in Slags and Fertilizers, R. Bras. Ci. Solo, 27:265-274, 2003.

(Continued)

*Primary Examiner* — Jennifer A Smith
(74) *Attorney, Agent, or Firm* — McNees, Wallace & Nurick LLC

(57) ABSTRACT

Agricultural blends are described. The agricultural blend includes synthetic gypsum having ammonium sulfate and a by-product of slag, the slag being selected from the group consisting of steel slag, stainless steel slag, alloy steel slag, carbon steel slag, and phosphate slag. Additionally or alternatively, the agricultural blend is delivered to soil, is a mineral soil amendment, is a soil conditioner, is a liming agent, is an additive to increase soil pH, is an additive to decrease metal toxicity, or a combination thereof.

20 Claims, 1 Drawing Sheet

(51) Int. Cl.

| | | |
|---|---|---|
| C05D 3/00 | (2006.01) | |
| B09C 1/08 | (2006.01) | |
| B01J 2/00 | (2006.01) | |
| C05C 3/00 | (2006.01) | |
| C05D 3/02 | (2006.01) | |
| C05D 5/00 | (2006.01) | |
| C05D 9/02 | (2006.01) | |
| C05G 3/08 | (2006.01) | |

(56) References Cited

U.S. PATENT DOCUMENTS

| | | | |
|---|---|---|---|
| 3,232,738 | A | 2/1966 | Bahme |
| 3,241,947 | A | 3/1966 | Young |
| 3,979,199 | A | 9/1976 | Collins et al. |
| 4,246,019 | A | 1/1981 | Sokolov et al. |
| 4,272,293 | A | 6/1981 | Hooykaas |
| 5,158,594 | A | 10/1992 | Oxford |
| 5,215,672 | A | 6/1993 | Rogers et al. |
| 5,362,471 | A | 11/1994 | Roth et al. |
| 5,510,094 | A | 4/1996 | Bhat et al. |
| 5,603,744 | A | 2/1997 | Kurner |
| 5,620,498 | A | 4/1997 | Ebert et al. |
| 5,628,811 | A | 5/1997 | College et al. |
| 5,743,934 | A | 4/1998 | Wommack et al. |
| 5,997,599 | A | 12/1999 | Wommack et al. |
| 6,036,740 | A | 3/2000 | Miller et al. |
| 6,074,988 | A | 6/2000 | King et al. |
| 6,274,111 | B1 | 8/2001 | Bauer et al. |
| 6,939,387 | B2 | 9/2005 | Elizer |
| 7,341,667 | B2 | 3/2008 | Kennard et al. |
| 7,449,118 | B2 | 11/2008 | Kennard et al. |
| 7,479,230 | B2 | 1/2009 | Kennard et al. |
| 7,744,691 | B2 | 6/2010 | Elizer et al. |
| 2003/0126898 | A1 | 7/2003 | You |
| 2004/0031304 | A1 | 2/2004 | Elizer |
| 2004/0221631 | A1 | 11/2004 | Kerrigan |
| 2005/0016421 | A1 * | 1/2005 | Fujimori et al. ............ 106/691 |
| 2005/0066860 | A1 * | 3/2005 | Logan et al. ............... 106/745 |
| 2007/0169527 | A1 | 7/2007 | Wynnyk et al. |
| 2011/0000855 | A1 | 1/2011 | Kuhel et al. |
| 2012/0060575 | A1 | 3/2012 | Miranda et al. |

FOREIGN PATENT DOCUMENTS

| | | |
|---|---|---|
| CN | 101362009 A | 2/2009 |
| CN | 101265136 B | 9/2010 |
| CN | 101429068 B | 4/2011 |
| DE | 1302386 B | 7/1971 |
| GB | 190403688 A | 2/1905 |
| GB | 313612 A | 7/1930 |
| GB | 359919 A | 10/1931 |
| JP | 55055719 A * | 4/1980 ............... E02D 3/12 |
| JP | 2007306844 A | 11/2007 |
| KR | 20050073162 A | 7/2005 |
| WO | 2011059328 A1 | 5/2011 |

OTHER PUBLICATIONS

"Effect of Elemental Sulfur, Gypsum, and Elemental Sulfur Coated Fertilizers, on the Availability of Sulfur to Rice", Navida Yasmin, et al., Journal of Plant Nutrition, 30:79-91, 2007 www.tandfonline.com , Mar. 13, 2007.

"The effect of grinding aids on the fine grinding of limestone, quartz and Portland cement clinker" S. Sohoni, R. Sridhar, G. Mandal, Department of Chemical Engineering, Indian Institute of Technology, Bombay Powai, Bombay-400 076 India; Received Oct. 3, 1990, Available online Nov. 7, 2001 http://www.sciencedirect.com/science/article/pii/003259109180109V.

Notification of Transmittal of the International Search Report and the Written Opinion of the International Searching Authority, or the Declaration, Mail Date: Sep. 30, 2015; PCT/US2011/051095; International Filing Date: Sep. 9, 2011; Applicant: HARSCO.

Database WPI, Week 198537, Thomson Scientific, London, GB; AN 2008-B45171; XP002667236, & JP 2007 306844 A (Kawashige Plant KK) Nov. 29, 2007 abstract 1,2,6-10,13-17.

Database WPI, Week 198537,Thomson Scientific, London, GB; AN 1985-226279; XP002667235,& JP 60 145982 A (Nippon Chem Ind Co Ltd) Aug. 1, 1985, abstract 1,2,6-10,13-17.

Database WPI, Week 200654, Thomson Scientific, London, GB; AN 2006-526281; XP002667237,& KR 2005 0073162 A (Pos Ceramics Co Ltd) Jul. 13, 2005, abstract 1,2,6-10,13-17.

DE 13 02 386 B (Zimmermann, Friedrich), Jul. 29, 1971; the whole document.

Database Compendex [Online], Engineering Information, Inc., New York, NY, US, Dec. 1975, Burdo R A et al: "Determination of Silicon in Glasses and Minerals by Atomic Absorption Spectrometry. ",XP002744709, Database accession No. E1X76020002350 abstract & Analytical Chemistry Dec. 1975, vol. 47, No. 14, Dec. 1975, pp. 2360-2364.

Database Biosis [Online]; Biosciences Information Service,Philadelphia, PA, US; 1980, Lichte F E et al: "Determination of Silicon and Aluminum in Biological Matrices by Inductively Coupled Plasma Emission Spectrometry", XP002744710, Database accession No. PREV198069069145 abstract & Analytical Chemistry, vol. 52, No. 1, 1980, pp. 120-124, ISSN: 0003-2700; 3-5, 18.

* cited by examiner

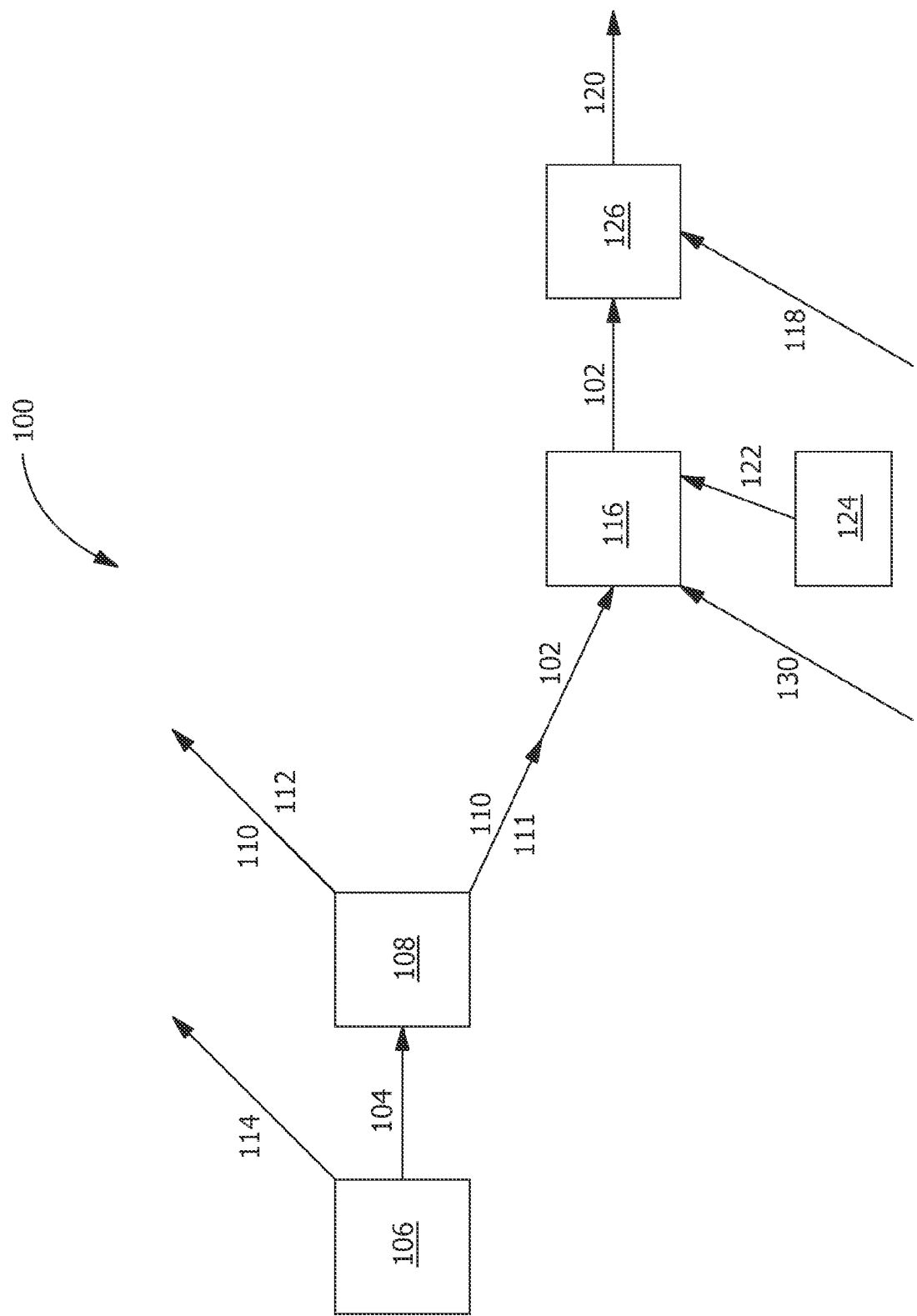

AGRICULTURAL BLEND AND PROCESS OF FORMING AN AGRICULTURAL BLEND

PRIORITY

This application is a continuation patent application, claiming priority and benefit of U.S. Non-Provisional patent application Ser. No. 12/879,432, titled "AGRICULTURAL BLEND AND PROCESS OF FORMING AN AGRICULTURAL BLEND," filed Sep. 9, 2010, which is hereby incorporated by reference in its entirety.

FIELD OF THE INVENTION

The present invention is directed to agricultural blends and processes of forming agricultural blends. More specifically, the present invention is direct to including by-products from industrial processes in agricultural blends.

BACKGROUND OF THE INVENTION

Specific minerals are known to stimulate growth in agriculture. Fertilizers and other additives can include minerals such as calcium silicate, magnesium silicate, potassium silicate, and sodium silicate. Similarly, compounds such as gypsum ($CaSO_4 \cdot H_2O$) can be used in agriculture (for example, as a soil stabilizer). Fertilizers and the other additives can deliver these minerals, these compounds, or combinations of these minerals and these compounds. The method of delivering the minerals or compounds, the crystal structure of the minerals or compounds, and the combination of the minerals or compounds impacts the efficacy of the fertilizers and other additives.

The minerals or compounds in the fertilizers or other additives can be natural (for example, mined) or synthetic (for example, a by-product of an industrial processes). Utilizing by-products can be environmentally beneficial by reducing waste and economically beneficial by creating economic value to existing waste. As described in U.S. Pat. No. 5,362,471, which is incorporated by reference in its entirety, synthetic gypsum is generally obtained as a by-product in the manufacture of phosphate containing fertilizers and as a by-product in the desulfurization of flue gas. According to U.S. Pat. No. 5,362,471, the synthetic gypsum has not experienced widespread commercial success because it has a different crystal size and shape than natural gypsum.

Another process of obtaining synthetic gypsum is described in U.S. Pat. No. 5,510,094, which is incorporated by reference in its entirety. The process described in U.S. Pat. No. 5,510,094 relates to treating the synthetic gypsum with ammonia and shows that a synthetic gypsum by-product from coal combustion can be used for agriculture upon being scrubbed with a slurry containing ammonia. The process does not include the combination of minerals that promote growth. Treating synthetic gypsum with anhydrous ammonia or a slurry containing ammonia can create an inhalation hazard with potential release of ammonia gas.

U.S. Pat. No. 6,939,387, which is incorporated by reference in its entirety, discloses a soil enhancer for use in the agriculture industry that does include certain minerals promoting growth. The patent disparages a product containing $MgSiO_3$ as being unable to provide sufficient silicon to plants for a sustained period of time without frequent applications. The patent also disparages a product having at least 15% of a resulting pellet coming from a calcium source such as gypsum from cement operations as not permitting enough silica to be applied without applying large amounts of pellets. The patent describes a composition including a calcium silicate slag (specifically, a by-product of mining operations), magnesium sulfite particles, and water in a ratio of about 20:4:1 for a non-granulated compound and about 2:7:4 for a granulated compound. The combination suffers from the drawbacks that it does not have the soil stabilizing effects of gypsum, does not utilize by-products from processes other than mining, does not include the benefits of magnesium silicate, and calcium silicate. This combination is only able to provide enough soluble silicon under acidic soil conditions.

What is needed is an agricultural blend that shows improvements in comparison to the prior art.

SUMMARY OF THE INVENTION

An embodiment of the present disclosure includes an agricultural blend, the agricultural blend including synthetic gypsum having ammonium sulfate and a by-product of slag, the slag being selected from the group consisting of steel slag, stainless steel slag, alloy steel slag, carbon steel slag, and phosphate slag.

Another embodiment of the present disclosure includes an agricultural blend, the agricultural blend including synthetic gypsum and a by-product of slag, the slag being selected from the group consisting of steel slag, stainless steel slag, alloy steel slag, carbon steel slag, and phosphate slag. The agricultural blend is delivered to soil, is a mineral soil amendment, is a soil conditioner, is a liming agent, is an additive to increase soil pH, is an additive to decrease metal toxicity, or a combination thereof.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Provided is an agricultural blend and a process of forming an agricultural blend. The agricultural blend can be, can be a portion of, or can include a fertilizer, a mineral soil amendment (for example, calcium and magnesium silicate), a soil conditioner (for water and stress management, the enhancement of plant vitality, the improvement of soil water and air movement, nutrient holding capacity, or combinations thereof); a liming agent (for example, calcium and magnesium silicate), an additive to improve soil pH, an additive to decrease metal toxicity issues, or any combination thereof. The agricultural blend can be environmentally-friendly by utilizing waste or by-product streams from one or more industrial processes. For example, in one embodiment, the agricultural blend can be formed from a by-product of coal combustion and a by-product of stainless steel slag.

Advantages of the agricultural blend include environmental benefits associated with utilizing a waste stream or by-product from coal combustion in a useful manner, environmental benefits associated with utilizing a waste stream or by-product from slag in industrial processes, improved ability for calcium silicate and/or magnesium silicate to be retained in agricultural substances for longer periods of time, improved ability to blend the calcium silicate/synthetic gypsum combination with various sources of nitrogen (such as monoammonium phosphate diammonium phosphate) without the risk of an ammonia flash), other suitable advantages, or a combination thereof.

In one embodiment, the agricultural blend includes a sulfate source and calcium silicate. The sulfate source can be any suitable non-hazardous sulfate source including, but not limited to, gypsum. The gypsum can be mined, synthetic, or a combination thereof. Using mined gypsum, synthetic gypsum, and combinations of mined gypsum and synthetic gypsum permits the effects of the structure of the gypsum to be controlled and/or adjusted. The synthetic gypsum can be from any suitable industrial process resulting in a desired concentration of sulfate. For example, in one embodiment, the synthetic gypsum can be a by-product of flue gas desulfurization in a coal combustion process.

Coal includes sulfur oxides (SOx). Monitoring emissions in coal combustion involves monitoring whether SOx is being emitted. To reduce SOx, various scrubbers or other systems remove sulfur, sulfates, sulfites, sulfur tiroxide, sulfur dioxide, or other sulfur-containing compounds. The SOx can be reduced and/or removed by flue gas desulfurization which involves circulating flue gas to remove sulfur from the flue gas and generating a by-product that includes the sulfur. There are two different methods of performing flue gas desulfurization that produce synthetic gypsum as a by-product. In a first method (assuming ideal operating conditions), wet scrubbing is performed with a $CaCO_3$ slurry (for example, a limestone slurry) to produce $CaSO_3$ (calcium sulfite):

$$CaCO_3 \text{ (solid)} + SO_2 \text{ (gas)} \rightarrow CaSO_3 \text{ (solid)} + CO_2 \text{ (gas)} \quad (1)$$

In a second method (assuming ideal operating conditions), wet scrubbing is performed with a $Ca(OH)_2$ slurry (for example, a lime slurry) to produce $CaSO_3$ (calcium sulfite):

$$Ca(OH)_2 \text{ (solid)} + SO_2 \text{ (gas)} \rightarrow CaSO_3 \text{ (solid)} + H_2O \text{ (liquid)} \quad (2)$$

After the $CaSO_3$ (calcium sulfite) is formed (either under the first method or the second method), it undergoes a forced oxidation process which converts it to $CaSO_4$ (for example, synthetic gypsum):

$$CaSO_3 \text{ (solid)} + H_2O \text{ (liquid)} + \tfrac{1}{2}O_2 \text{ (gas)} \rightarrow CaSO_4 \text{ (solid)} + H_2O \quad (3)$$

In operation, the lime or limestone slurry is present with the synthetic gypsum after the flue gas desulfurization. Depending upon the concentration of sulfur in the coal and the other limiting aspects of the reactions, the by-product of the flue gas desulfurization can include a predetermined amount of synthetic gypsum and lime or limestone. In one embodiment, the by-product of the flue gas desulfurization includes about 90% to about 95% calcium sulfate ($CaSO_4$-$2H_2O$), about 1% to about 2% calcium sulfite ($CaSO_3$-$\tfrac{1}{2}H_2$), and about 2% to about 3% calcium carbonate ($CaCO_3$). The remaining portion can include magnesium sulfate/sulfite.

The by-product of the flue gas desulfurization is further processed to achieve desired physical properties. For example, the by-product can be filtered through one or more mesh stages. In one embodiment, 99% of the by-product is smaller than #20 mesh, 90% of the by-product is smaller than #60 mesh, 75% of the by-product is smaller than #100 mesh. Additionally or alternatively, moisture content can be adjusted to a predetermined range (for example, by a mechanical watering devices, filters, centrifuges, or combinations thereof). The predetermined range of moisture content can be between about 10% and about 18%, between about 10% and about 15%, between about 7% and about 12%, between about 5% and about 7%, or at about 5%. In one embodiment, the lime or limestone forms about 90% to about 99% of the by-product. In another embodiment, the gypsum forms about 90% to about 99% of the by-product.

Additionally or alternatively, the sulfate source can be a by-product of other industrial processes. For example, the sulfate source can be a by-product formed from slag in a coal combustion process, a by-product formed from bottom-boiler ash in a coal combustion process, a by-product formed from hydrogen sulfide produced from a pickling liquor, or any suitable combination thereof.

In one embodiment, the sulfate source includes ammonium sulfate. In this embodiment, instead of using the lime or limestone slurry, ammonia may be used as a reactant in an industrial process (such as flue gas desulfurization in coal combustion) to yield $(NH_4)_2SO_4$ (ammonium sulfate). However, since the composition is chemically different from gypsum, the use and application of the resulting agricultural blend may differ from the use and application of the embodiment including gypsum. In addition, the pH of the resulting component is higher, thereby permitting a blending of the ammonium sulfate and the by-product of flue gas desulfurization (or other sulfate source) to achieve a desired pH.

The calcium silicate blended with the sulfate source can be from any suitable source. The calcium silicate can be any suitable non-hazardous industrial by-product including, but not limited to, a by-product from stainless steel slag, a by-product from alloy steel slag, or any suitable combination thereof. In one embodiment, the calcium silicate is blended with magnesium silicate, which can be formed of mined magnesium silicate, synthetic magnesium silicate, or a combination thereof.

In one embodiment, the calcium silicate by-product contains calcium, magnesium, and silicon. The calcium can form about 26% to about 28% of the by-product. The magnesium can form about 6% to about 8% of the by-product. The silicon can form about 30% to about 39% of the by-product. The by-product can include soluble silicon providing greater than about 10 lbs/ton.

The sulfate source, calcium silicate, and other suitable components are blended together by high speed blending to form the agricultural blend. The agricultural blend is a colloidal suspension. The agricultural blend can be in any suitable form for delivery to plants, soil, or other agricultural substances. For example, the blend can be pelletized or agglomerated, which may involve including additional components such as binders.

In one embodiment, the composition of the agricultural blend includes about 75% to about 95% sulfate source and about 5% to about 25% calcium silicate by weight. In one embodiment, the agricultural blend includes about 88.5% sulfate source and about 12.5% calcium silicate. The combined wet blend of the agricultural blend can include about 5% to about 6% $H_2O$, about 20% to about 24% calcium, about 4% to about 6% magnesium, and about 17% to about 19% sulfur. In one embodiment, the wet blend of the agricultural blend includes about 5.6% $H_2O$, about 22.2% calcium, about 0.05% magnesium, and about 17.5% sulfur. The combined dry blend of the agricultural blend can include about 22% to about 26% calcium, about 0.04% to about 0.06% magnesium, and about 17.5% to about 19.5% sulfur. In one embodiment, the dry blend of the agricultural blend includes about 23.5% calcium, about 0.05% magnesium, and about 18.5% sulfur. The pH of the agricultural blend can be about 7.5 to 8.5 or about 8.1. However, as discussed above, the pH can be raised by including ammonium sulfate.

The agricultural blend can improve handling by 25%, can improve flow ability by 15%, and/or can improve storability 30%.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An agricultural blend, comprising:
synthetic gypsum having ammonium sulfate; and
a by-product of slag, the slag being selected from the group consisting of steel slag, stainless steel slag, alloy steel slag, carbon steel slag, and phosphate slag.

2. The agricultural blend of claim 1, wherein the by-product is steel slag.

3. The agricultural blend of claim 1, wherein the by-product is stainless steel slag.

4. The agricultural blend of claim 1, wherein the by-product is alloy steel slag.

5. The agricultural blend of claim 1, wherein the by-product is carbon steel slag.

6. The agricultural blend of claim 1, wherein the by-product is phosphate slag.

7. The agricultural blend of claim 1, wherein the agricultural blend is delivered to soil.

8. The agricultural blend of claim 1, wherein the agricultural blend is a mineral soil amendment.

9. The agricultural blend of claim 1, wherein the agricultural blend is a soil conditioner.

10. The agricultural blend of claim 1, wherein the agricultural blend is a liming agent.

11. The agricultural blend of claim 1, wherein the agricultural blend is an additive to increase soil pH.

12. The agricultural blend of claim 1, wherein the agricultural blend is an additive to decrease metal toxicity.

13. The agricultural blend of claim 1, wherein the synthetic gypsum includes a by-product formed by flue gas desulfurization in a coal combustion process.

14. The agricultural blend of claim 1, wherein the synthetic gypsum includes a by-product formed from slag in a coal combustion process.

15. The agricultural blend of claim 1, wherein the synthetic gypsum includes a by-product formed from bottom boiler ash in a coal combustion process.

16. The agricultural blend of claim 1, wherein the synthetic gypsum includes a by-product formed from hydrogen sulfide produced from a pickling liquor.

17. The agricultural blend of claim 1, wherein the agricultural blend comprises calcium silicate.

18. The agricultural blend of claim 1, wherein the agricultural blend comprises magnesium silicate.

19. The agricultural blend of claim 1, wherein the agricultural blend is pelletized or agglomerated.

20. An agricultural blend, comprising:
synthetic gypsum and a by-product of slag, the slag being selected from the group consisting of steel slag, stainless steel slag, alloy steel slag, carbon steel slag, and phosphate slag;
wherein the agricultural blend is pelletized or agglomerated.

* * * * *